J. W. MOYER.
Improvement in Clipping Machines.
No. 125,209. Patented April 2, 1872.
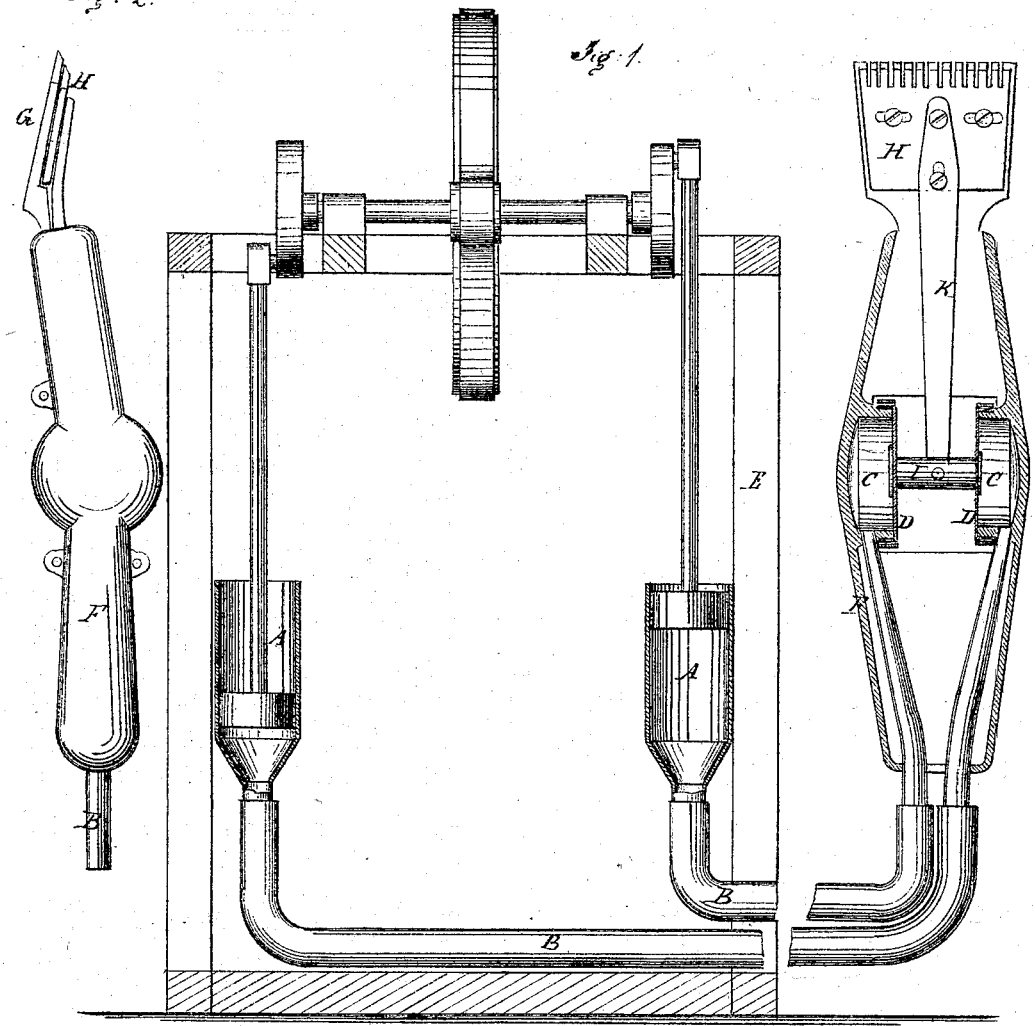

UNITED STATES PATENT OFFICE.

JONAS W. MOYER, OF COOPERSTOWN, NEW YORK.

IMPROVEMENT IN CLIPPING-MACHINES.

Specification forming part of Letters Patent No. 125,209, dated April 2, 1872.

Specification describing a new and Improved Horse-Clipping Machine, invented by JONAS W. MOYER, of Cooperstown, in the county of Otsego and State of New York.

The invention consists in an improvement upon that class of horse-clippers in which air-power is employed, either upon the compressive or exhaustive principle. It will first be fully described, and then clearly pointed out in the claim.

Figure 1 is a sectional elevation of a double-acting transmitting and impelling apparatus. Fig. 2 is a side elevation of a part of the apparatus shown in Fig. 1.

Similar letters of reference indicate corresponding parts.

I propose to use pumps A, of any suitable kind, or any equivalent thereof, for impelling the air, with conducting-tubes B of flexible character, air-chambers C, and flexible diaphragms D, for actuating the movable cutter-bar, said bar being connected to the said diaphragm in any suitable way to be moved by them as they are moved by the air, the said apparatus being either double or single acting, according to preference. The diaphragms, which are caused to vibrate by the alternate action of air forced against one side, and the action of the external air on the other side when the first side is relieved from pressure, are arranged in the handle employed for moving the clippers around the body of the animal, while the pumps or other impelling apparatus may be affixed to the side of the stall or to a portable support, E, for moving about from one stall to another.

In Figs. 1 and 2 I have represented a hollow handle, F, with the stationary cutter G and movable one H projecting from one end, while the tubes enter at the other end, and two chambers, C, front each other near the center, with a considerable space between each chamber, and hermetically closed by a flexible diaphragm, D, and each diaphragm is connected at the center to one end of a rod, I, to which the long arm of a lever, K, is connected, the other arm of said lever being connected to the movable cutter. For each chamber C and its diaphragm a separate pump and tube are used, and the pumps are so geared that one sucks the air back from one chamber, C, while the other forces the air out to the other chamber, and vice versa, thereby imparting a to-and-fro motion to the rod I, which operates the lever K correspondingly.

Having thus described my invention, I claim as new and desire to secure by Letters Patent—

The flexible diaphragms D D, arranged in connection with air-chambers C C, and in combination with rod I and lever K, and the cutters G H, as and for the purpose described.

J. W. MOYER.

Witnesses:
    T. B. MOSHER,
    GEO. W. MABEE.